Figure 1:
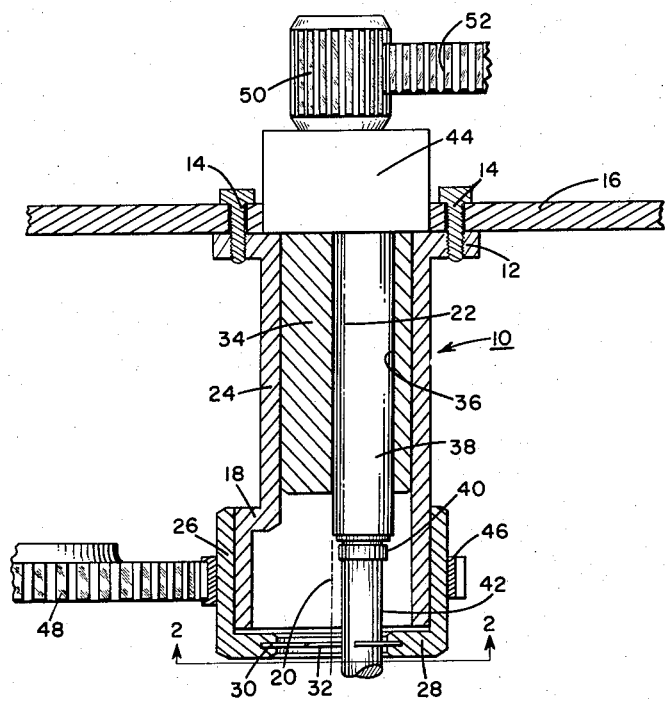

March 20, 1962  V. WINKLER ET AL  3,025,738

CUTTING APPARATUS

Filed Aug. 26, 1960

*INVENTORS*
VIKTOR WINKLER
LEONHARD GOEBBELS
KARL-HEINZ KRÄMER

BY
ATTORNEY

United States Patent Office 3,025,738
Patented Mar. 20, 1962

3,025,738
CUTTING APPARATUS
Viktor Winkler, Hohergrenzhausen, near Koblenz, Leonhard Goebbels, Solingen-Ohligs, and Karl-Heinz Krämer, Freiburg im Briesgau, Germany, assignors to Clevite Corporation, Cleveland, Ohio, a corporation of Ohio
Filed Aug. 26, 1960, Ser. No. 52,276
Claims priority, application Germany Oct. 29, 1959
8 Claims. (Cl. 82—70.2)

This invention relates to apparatus for cutting barshaped bodies transversely of their longitudinal axis.

Inasmuch as the invention has particular importance and advantages in its application to the cutting of semiconductor crystals into slices it will be described in this environment by way of example. However, it will be appreciated that the apparatus may be employed with advantage wherever it is necessary to make transverse cuts in a bar of any type of material, whether the cuts are made entirely across the bar to subdivide it into segments or only partially across the bar.

In the commercial production of semiconductor devices, the semiconductor material, such as germanium or silicon, from which the wafers are fabricated is initially prepared in relatively large monocrystalline ingots by any one of several known methods, such as the Czochralski process, zone levelling, or the like. The ingot usually is of bar-like configuration and the first step toward its subdivision, ultimately to form the tiny dice or wafers utilized in the semiconductor devices, is to cut the ingot transversely into thin slices. This is usually accomplished at the present time by means of a rotary diamond saw which, in its simplest form, consists of a cutting disk coaxially mounted at its center on a rotatable arbor driven from a suitable power source. Diamond dust is imbedded in or applied to the outer periphery or cutting edge of the disk.

While this cutting method is perhaps the most widely used at the present time it has important inherent disadvantages. Due to its mounting and construction, it is difficult or impossible to avoid some degree of flexing of the discoid blade. Consequently, because of the extreme precision desired in the slicing of semiconductor crystal so as to avoid variations in thickness of the wafers into which the slice is eventually subdivided, relatively thick saw blades have been employed to minimize the problem of flexing. The thicker blades, however, result in a greater proportion of cutting waste and this is an important disadvantage in its own right, in view of the relatively high cost of the processed material being cut.

One possible solution to the problem which has been considered is the use of the so-called "I.D." saw or cutter such as used in cutting diamonds. This type of saw is of annular discoid configuration, mounted by suitable means engaging its outer circumference and having its cutting edges on its inner circumference. Cutting is accomplished by inserting the workpiece into the hole in the disk and moving it radially outward. I.D. cutters have the advantage of reduced flexing which stems from the fact that they are supported over a large circumferential portion as compared to the cutting portion. As a result, higher tolerances are possible and cutting waste is reduced.

I.D. cutters, however, have their own characteristic disadvantages which, while perhaps tolerable in such low volume of operations as diamond cutting, have heretofore prevented their adoption in other fields, such as the slicing of semiconductor crystals. These stem from the customary manner in which the work is fed to the saw. The saw is usually mounted in a drum-like or cup-like holder and the work piece fed into the cutting aperture from outside the holder. Consequently, the portion being cut, if completely severed, falls into the holder. To avoid the need of complicated arrangements for ejecting or removing the severed part from the drum, the work piece generally is not sawed completely through; instead a small part is left at one edge which is subsequently broken-off to detach the slice. Another manner in which the need for removing the cut-off slice from the cutter holding drum is circumvented is by cementing the work piece to a support or mounting which extends its entire length. In this way the workpiece may be cut completely through but the support holds the severed piece in place.

Neither solution is completely satisfactory. Where the device is not cut through entirely, a roughness results at the broken edge. Where the work piece is cemented to a support there is the need for removing the severed pieces from the support and removing cement adhering to the pieces. Another drawback of using a support is that it precludes resort to work piece rotation to reduce the required cutter diameter, i.e., if the work piece can be rotated while being cut this reduces by one-half the radius of the cutter necessary to sever a bar of given cross-section.

The use of work piece rotation to reduce cutter diameter is commonly resorted to in connection with centermounted cutting disks but, heretofore, has not been employed in conjunction with I.D. cutters for the foregoing reason and also because the various difficulties and complexities which would be introduced into the apparatus outweigh the advantages.

It is the fundamental general object of the present invention to avoid, overcome or minimize at least one of the problems of the prior art as outlined above.

A more specific object is the provision of cutting apparatus employing an I.D. cutter in which the severed parts fall free and clear of the cutting mechanism.

A corollary object of that immediately above is the provision of cutting apparatus employing an I.D. cutter which permits complete severance of the portions of the workpiece without creating the problem of, or requiring special provisions for, retrieving the severed portions.

Another object of the invention is the provision of cutting apparatus employing an I.D. cutter in which the work piece can be rotated about its axis while being cut thereby permitting the use of a smaller diameter cutter in proportion to the maximum diameter of work piece which can be cut.

A further object is the provision of apparatus for cutting objects of bar-like configuration into thin slices with closer tolerances and less cutting waste than heretofore possible.

These and additional objects are fulfilled by cutting apparatus in accordance with the invention which comprises a housing open at one end and means for mounting an I.D. cutter, disposed in a plane perpendicular to the longitudinal axis of the housing, at the open end of the housing. Means are provided for rotating the cutter at high speed and a work holder is disposed within the housing and is mounted for rotation about an axis perpendicular to the plane of the cutter. The work holder also is mounted for planetating movement about the axis of the housing.

In accordance with another feature of the invention the axis of the work holder, the axis of the housing, and the axis of rotation of the cutter are mutually eccentric.

Figure 2:
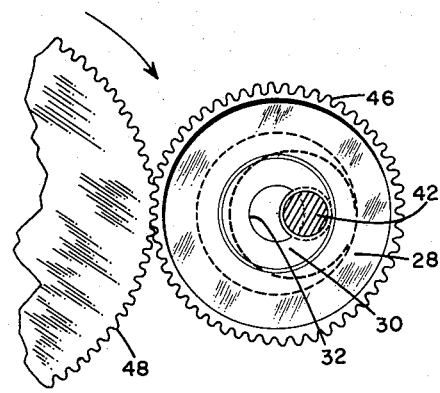

Additional objects of the invention, its advantages, scope and the manner in which it can be practiced will be readily apparent to persons conversant to the art from the following description of an exemplary embodiment thereof, taken in conjunction with the subjoined claims and the annexed drawings in which like reference numerals designate like parts throughout the several views and in which, FIGURE 1 is an axial section through a cutting apparatus as contemplated by the invention; and FIGURE 2 is an end view of the apparatus as seen from line 2—2, FIGURE 1, looking in the direction of the arrows.

Referring to the drawing, the principal structural component of the apparatus illustrated is a hollow, generally cylindrical housing member designated in its entirety by reference numeral 10. At one end of housing 10 is a radial flange 12 through which pass a series of threaded fastenings 14 securing the housing to a suitable support structure fragmentarily illustrated and designated by reference numeral 16. It will be understood that while housing 10 is shown with its longitudinal axis in a vertical position, and this arrangement is preferred for reasons appearing hereinafter, a horizontal position is also satisfactory.

At the end remote from bolting flange 12 housing 10 is formed or provided with an enlarged, cylindrical portion 18 constituting a minor fraction of the over all length of the housing. The axis 20 of enlarged portion 18 is eccentric with respect to the axis 22 of the remaining, major portion 24 of housing 10.

In the illustrated embodiment the amount of eccentricity, i.e., the distance between axes 20 and 22, is equal to the difference between the respective radii of the main housing portion and the enlarged housing portion.

Mounted on enlarged portion 18 for rotation about axis 20, is a generally cylindrical tool holder 26 having an inwardly extending annular flange 28 overlying the open end of the enlarged housing portion. Mounted on the inner circumferential edge of tool-holder flange 28 is an annular discoid cutter 30 of the I.D. type.

The outer circumferential edge of cutter 30 is clamped or otherwise secured to flange 28 and the inner circumference 32 provided with a suitable cutting edge. The aperture in the cutter, bounded by cutting edge 32, is concentrically disposed with respect to the common axis (20) of tool holder 26 and enlarged housing portion 18 and, therefore, is eccentric to longitudinal axis 22 of major housing portion 24.

Rotatably disposed within major portion 24 of housing 10 is a cylindrical sleeve member 34 containing an eccentric longitudinal bore 36. Sleeve member 34 is axially slidable in, and considerably shorter in length than, major housing portion 24.

Rotatably disposed in bore 36 of the sleeve member is a work-holder element 38 somewhat longer tthan and projecting, in a direction toward cutter 30, from the sleeve member. The projecting end of work holder 38 carries a chuck or other suitable means 40 for clamping or otherwise adjustably mounting a work piece represented in the drawing by a crystal bar 42. While the work holder 38 is rotatable in its mounting sleeve 34 it is fixed against axial displacement with respect thereto by any suitable structural arrangement.

At the end of housing 10 remote from cutter 30 is a gear case 44 enclosing suitable power transmission means for simultaneously rotating work holder 38 and sleeve 34 each about its respective longitudinal axis. Due to the aforementioned eccentricities, this results in rotation of work holder 38 in its bore 36 and planetation or orbital movement of the work holder about the longitudinal axis 22 of the main housing portion 24. By having the eccentricity of bore 36 with respect to the main housing portion 24 equal to the eccentricity of enlarged housing portion 18 with respect to the main housing portion, it will be appreciated that at one point of the planetary path of the work holder, its axis coincides with that of the enlargement 18 and, therefore, the work holder and the work mounted thereby are coaxially aligned with the aperture in cutter 30. This position will be hereinafter referred to as the zero position.

The transmission enclosed within gear case 44 may take any operative and convenient form capable of performing the functional prerequisites already mentioned, viz., it must impart simultaneous axial rotation to sleeve 34 and work holder 38 while permitting axial displacement of these members as a unit within housing portion 24.

In a practical embodiment of the apparatus suitable means would be provided for indexing the axial displacement of sleeve 34 and work holder 38 and locking the unit in position during a cut. It would be desirable also to provide a suitable locking mechanism (not shown) to prevent axial movement of the sleeve and work holder except when the latter is in the zero position. This function is automatically performed by the illustrated structure as a result of the relative eccentricities of various components as will be readily apparent when the operation of the apparatus is described.

Cutter-mounting member 26 and, concomitantly, cutter 30, are rotated at relatively high speed, e.g., 4,000 to 5,000 r.p.m., by a suitable belt or gear drive. For purposes of illustration member 26 is shown as having a ring of gear teeth 46 formed on its outer peripheral surface engaging a drive gear illustrated fragmentarily at 48.

The transmission provided within gear case 44 may take the form of a planeary gear train, for example, actuated by means of a projecting stub shaft 50 geared to a drive gear shown fragmentarily at 52. The gearing is arranged so that work holder 38, revolves at a rate of about 10 to 100 r.p.m. and sleeve 34 makes a single revolution per cut. After each cut the tool holder and sleeve assembly is advanced a preselected amount corresponding to the desired thickness of the segment to be cut off. This may be done manually or accomplished automatically by means of a suitable program control.

The operation of the apparatus is as follows. With the parts in the zero position work holder 38 is coaxially aligned with the internal aperture of the cutting tool 30; this permits insertion of work piece 42 which may be cemented to or chucked in the work holder in any desired manner.

With the work piece in position the apparatus is started: gear 48 rotates cutting tool holder 26 and, therefore, cutting tool 30 at a high rate of speed about stationary axis 20; at the same time, work holder 38 and, therefore, the work piece 42 rotates about the work holder axis at a relatively slow rate of speed, e.g., 10 to 100 r.p.m., and sleeve 34 rotates at a rate of speed determined by the cutting rate tolerated by the particular material and the cutting tool so as to complete one revolution per unit cutting operation. As a result of the rotation of sleeve member 34, work piece is moved in a planetary or orbital path about axis 22 and into engagement with the cutting edge 32 of cutter 30. Due to the double eccentricities involved, i.e., that of enlarged housing portion 18 and bore 36 both with respect to axis 22 of main housing portions 24, and the axial rotation of the work holder 38, only one-half a revolution of sleeve 34 is required to cut through the entire cross-section of work piece 42. At the completion of the revolution, work holder-sleeve assembly 38, 34 is indexed toward the cutting tool a predetermined amount and the cutting process repeated.

If desired or necessary a jet of cooling and/or lubricating fluid can be played against the cutting tool. Due to the vertical position of the apparatus cutting fluid and debris flow freely from the apparatus. In a horizontal position special jets and channels (not shown) may be provided for this purpose.

While there have been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. Apparatus for cutting a bar-shaped object transversely of its longitudinal axis, comprising: an annular cutting member having a cutting edge on its inner circumference; means mounting said cutting member for rotation in a plane perpendicular to an axis through its center; an elongated work holder adapted to mount a work piece at one end; and means mounting said work holder, with its longitudinal axis perpendicular to said plane, for rotation about its own longitudinal axis and simultaneous planetating movement about an axis spaced from and parallel to both the respective axes of rotation of said cutting member and work holder.

2. Apparatus for cutting a bar-shaped object transversely of its longitudinal axis comprising: an annular cutting member having a cutting edge on its inner circumference; means mounting said cutting member for rotation in a plane perpendicular to an axis through its center; an elongated work holder adapted to mount a work piece at one end; and means mounting said work holder, with its longitudinal axis perpendicular to said plane for rotation about its own longitudinal axis and simultaneous planetating movement about an axis equally spaced from, and parallel to, both the respective axes of rotation of said cutting member and work holder.

3. Apparatus for cutting a bar-shaped object transversely of its longitudinal axis, comprising: a hollow cylindrical housing; an annular discoid cutting member, having a cutting edge on its inner circumference, mounted adjacent one end of said housing for rotation in a plane perpendicular to the longitudinal axis of said housing; means for rotating said cutting member at relatively high speeds; a cylindrical sleeve member coaxially slidably and rotatably disposed within said housing and containing a longitudinal bore; a cylindrical work holder rotatably mounted in the bore in said sleeve member and projecting therefrom in the direction of said enlarged housing portion, the projecting portion of said work holder being adapted to mount a work piece; and means for rotating said sleeve member in said housing and said work holder in said bore.

4. Apparatus in accordance with claim 3 wherein said last named means comprises a single drive transmission constructed and arranged to rotate said work holder at from 10 to 100 r.p.m. and said sleeve member once during each cut performed.

5. Apparatus for cutting a bar-shaped object transversely of its longitudinal axis, comprising: a hollow cylindrical housing having at one end a radially enlarged cylindrical portion, the longitudinal axis of said enlarged portion being displaced eccentrically from the longitudinal axis of the remaining portion of the housing; an annular discoid cutting member, having a cutting edge on its inner circumference, mounted adjacent the enlarged end portion of said housing for rotation about the longitudinal axis of the enlarged housing portion whereby said cutting edge is eccentric to the longitudinal axis of said remaining housing portion; means for rotating said cutting member at relatively high speeds; a cylindrical sleeve member coaxially slidably and rotatably disposed within said remaining housing portion and containing a longitudinal bore extending parallel and eccentric to the longitudinal axis of said sleeve member; a cylindrical work holder rotatably mounted in the bore in said sleeve member and projecting therefrom in the direction of said enlarged housing portion, the projecting portion of said work holder being adapted to mount a work piece; and means for rotating said sleeve member in said housing and said work holder in said bore.

6. Apparatus according to claim 4 wherein the eccentricity of said bore with respect to the longitudinal axis of said sleeve member is equal to that between the respective longitudinal axes of said housing portions.

7. Apparatus for cutting a bar-shaped object transversely of its longitudinal axis, comprising: a hollow cylindrical housing having at one end a radially enlarged cylindrical portion, the longitudinal axis of said enlarged portion being displaced eccentrically from the longitudinal axis of the remaining portion of the housing by an amount substantially equal to the difference between the respective radii of said portions; a generally cylindrical cutter-mounting member rotatably mounted on said enlarged portion and having an inwardly turned, annular flange coaxial with, and overlying the end of, said enlarged portion; an annular discoid cutting member coaxially mounted on said flange and having a cutting edge on its inner circumference, whereby said cutting edge is eccentric to the longitudinal axis of said remaining housing portion; means for rotating said cutter-mounting member at relatively high speeds; a cylindrical sleeve member coaxially slidably and rotatably disposed within said remaining housing portion and containing a longitudinal bore eccentric to the longitudinal axis of said sleeve member by the same amount as are said axes of the enlarged housing portion and remaining housing portion; a cylindrical work holder rotatably mounted in the bore said in sleeve member and projecting therefrom in the direction of said enlarged housing portion, the projecting portion of said work holder being adapted to mount a work piece; and means for rotating said sleeve member in said housing and said work holder in said bore.

8. Apparatus in accordance with claim 7, wherein said last-named means comprises a single drive transmission constructed and arranged to rotate said work holder at 10 to 100 r.p.m. and said sleeve member once during each cut performed.

References Cited in the file of this patent

UNITED STATES PATENTS

| | | |
|---|---|---|
| 931,043 | Davis | Aug. 17, 1909 |
| 1,063,789 | Gorton | June 3, 1913 |
| 1,284,315 | Gorton | Nov. 12, 1918 |